United States Patent
Reddy et al.

(10) Patent No.: US 6,406,724 B1
(45) Date of Patent: Jun. 18, 2002

(54) NATURAL BIOGENERATED CHEESE FLAVORING SYSTEM

(75) Inventors: Divya Shree Reddy, Lake Zurich; James William Moran, Antioch; Bashir Aideloje Elabor, Evanston; David Webb Mehnert, Lake Villa; Rudolf Johann Fritsch, Chicago, all of IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 69 days.

(21) Appl. No.: 09/659,459

(22) Filed: Sep. 12, 2000

(51) Int. Cl.[7] ................................................. A23C 9/12
(52) U.S. Cl. .............................. 426/34; 426/35; 426/36; 426/534; 426/535; 426/580; 426/582; 426/650
(58) Field of Search .............................. 426/34, 35, 36, 426/37, 38, 39, 40, 534, 535, 580, 582, 650

(56) References Cited

U.S. PATENT DOCUMENTS

| | | | |
|---|---|---|---|
| 3,100,153 A | 8/1963 | Knight | 99/116 |
| 4,244,971 A | 1/1981 | Wargel et al. | 426/35 |
| 4,716,045 A | 12/1987 | Prella | 426/63 |
| 5,211,972 A | 5/1993 | Kratky et al. | 426/35 |
| 5,262,183 A | 11/1993 | Moran et al. | 426/40 |
| 5,271,949 A | 12/1993 | Haring et al. | 426/317 |
| 5,356,640 A | 10/1994 | Jameson et al. | 426/40 |
| 5,455,051 A | 10/1995 | Groesbeck et al. | 426/35 |
| 5,549,916 A | 8/1996 | Gamay | 426/39 |
| 5,635,228 A | 6/1997 | Sponholtz | 426/36 |
| 5,895,671 A | 4/1999 | Adamany et al. | 426/36 |
| 5,952,022 A | 9/1999 | Veal | 426/36 |
| 6,022,567 A | 2/2000 | Lecouteux | 426/35 |
| 6,054,151 A | 4/2000 | Kwon et al. | 426/36 |
| 6,251,445 B1 * | 6/2001 | Han et al. | 426/36 |

OTHER PUBLICATIONS

Tamime, A., et al., "The Quality of Processed Cheese Made From Reconstituted Skim Milk Powder Cheese Base", *Egyptian J. Dairy Sci.*, 18:115–131 (1990).

Sood, V.K. and Kosikowski, F.V., "Process Cheddar Cheese from Plain and Enzyme Treated Retentates," 1979, J. Dairy Sci. 62:1713–1718.

Aly, M.E., Abdel–Baky, A.A., Farahat, S.M., "Quality of Processed Cheese Spread Made Using Ultrafiltered Retentates Treated with some Ripening Agents," 1995, Int. Dairy Journal 5, 191–209.

Weimer, B. et al., "Influence of NaCl and pH on intracellular enzymes that influence Cheddar cheese ripening*," 1977, Lait, pp. 383–398.

Rattray, Fergal P., and Fox, Patrick F., "Aspects of Enzymology and Biochemical Properties of *Brevibacterium linens* Relevant to Cheese Ripening: A Review[1]," 1999, J. Dairy Sci. pp. 82:891–909.

* cited by examiner

*Primary Examiner*—Leslie Wong
(74) *Attorney, Agent, or Firm*—Fitch, Even, Tabin & Flannery (57) ABSTRACT

A natural biogenerated cheese flavoring system is provided which can be used to prepare very different cheeses having desired flavor profiles. More specifically, the present cheese flavoring system contains a sulfury-cheddar flavored component, a creamy-buttery flavored component, and a cheesy flavored component. Each of these flavored components can be used as flavor building blocks with their own specific flavor profiles and/or characteristics. Using various combinations of these flavored components, cheeses having a wide variety of flavors can be produced. The flavored components are separately prepared from a highly concentrated milk substrate using compositions (e.g., specific enzymes, cultures, and additives) and process conditions designed to provide the flavored components having specific flavor profiles and/or characteristics. The flavor concentrates can be used in process cheese, process cheese-type products, or other cheeses to produce very different cheeses with desired flavor profiles. The flavor concentrates can also be used as a natural flavoring system in other food products.

44 Claims, 1 Drawing Sheet

NATURAL BIOGENERATED CHEESE FLAVORING SYSTEM

FIELD OF THE INVENTION

The present invention relates generally to a natural biogenerated cheese flavoring system which can be used to prepare very different cheeses having desired flavor profiles. More specifically, the present invention relates to a natural biogenerated cheese flavoring system comprising a sulfury-cheddar flavored component, a creamy-buttery flavored component, and a cheesy flavored component. Each of these flavored components can be used as flavor building blocks with their own specific flavor profiles and/or characteristics. Using various combinations of these flavored components, cheeses having a wide variety of flavors can easily be produced. The flavored components are separately prepared from a highly concentrated milk substrate using ingredients (e.g., specific enzymes, cultures, and additives) and process conditions designed to provide the flavor components having specific flavor profiles and/or characteristics. The flavor components can be used in process cheese, natural cheese, or other cheeses to produce very different cheeses with desired flavor profiles. The flavor concentrates can also be used as a natural flavoring system in other food products.

BACKGROUND OF THE INVENTION

Natural cheese is generally made by developing acidity in milk and setting the milk with a clotting agent, such as rennet, or by developing acidity to the isoelectric point of the protein. The set milk is cut and whey is separated from the resulting curd. The curd may be pressed to provide a cheese block. Curing typically takes place over a lengthy period of time under controlled conditions. Cheddar cheese, for example, is cured for a period of at least four months and may be cured for a period in excess of one year to obtain the full flavor desired in cheddar cheese.

It is well known to provide a product having some of the characteristics of natural cheese by grinding a natural cheese, and heating it with an emulsifying salt. The name given to the resulting product depends upon the ingredients used and its composition and, in some instances, is determined by regulations promulgated by the U.S. Food and Drug Administration 21 C.F.R. §133.169–180. For example, the term "pasteurized process cheese" refers to a product comprising a blend of cheeses to which an emulsifying agent, usually an emulsifying salt, and possibly acids, have been added, and which has then been worked and heated into a homogeneous plastic mass. The flavor of process cheese is dependent on utilizing a high proportion of long hold (aged over four months) natural cheese. The use of long hold cheese increases the cost of process cheese due to storage and inventory costs. The yield of natural cheese produced by conventional methods is relatively low; generally about 10–12 pounds of cheese are produced per 100 pounds of milk. This also increases costs.

The term "pasteurized process cheese food" refers to a product which is prepared from the same materials and the same processes used for manufacture of process cheese. However, such cheese foods generally have dairy ingredients added thereto, such as cream, milk, skimmed milk, whey, or any of these from which part of the water has been removed (e.g., concentrated skimmed milk). The moisture level in process cheese food is generally higher than that of process cheese and may be up to about 44 percent. Fat is generally present at a level of not less than 23 percent.

The term "pasteurized process cheese spread" refers to a product which is similar to cheese food, in the sense that it can contain the indicated dairy ingredients. Process cheese spreads, however, may have moisture levels as high as 60 percent and minimum fat levels of 20 percent.

Process cheese, process cheese food, and process cheese spread are referred to as "standardized products," since their methods of manufacture and composition are determined by Federal Standards of Identity.

As used herein, the term "process cheese-type products" includes those products known and referred to as "pasteurized process cheese," "pasteurized process cheese food," "pasteurized process cheese spread," and "pasteurized process cheese product." "Process cheese type-products" also includes products resembling process cheese, process cheese food, process cheese spread, and process cheese product, but which may not meet the U.S. Federal Standards of Identity for any of the above products in that they may contain ingredients not specified by such Standards, such as vegetable oil or vegetable protein, or may not meet the compositional requirements of such Standards. Process cheese-type products also include products having flavor and texture similar to those of a process cheese-type product regardless of the ingredients or manufacturing steps employed, and regardless of whether the Standards have been met.

There have been many efforts to produce a naturally derived highly flavored cheese ingredient, which can be used in process cheese, in a shortened period of time. For example, U.S. Pat. No. 4,752,483 is directed to a method for producing a highly flavored cheese ingredient. In this process, cheese curd is first produced, the resulting "green" cheddar-type cheese curds are ground and then combined with a protease, a lipase, and water and incubated for about 5 to 6 days. The term "green" cheddar-type cheese curd refers to a cheddar cheese which has been aged less than about 60 days.

U.S. Pat. No. 4,172,900 is directed to producing a natural cheese product having a highly intensified American cheese flavor which is adapted for use in the preparation of process cheese. In the method, cheese curd is produced in the usual way, wherein a coagulum is produced from milk, the coagulum is cut to produce curds and whey and the whey is drained to provide cheese curds. The curd particles are produced, mixed with salt, a source of lipolytic enzyme, and a source of a proteolytic enzyme and cured for a period of time sufficient to produce increased levels of $C_2$–$C_{10}$ fatty acids, as compared to conventional American-type cheese.

U.S. Pat. No. 4,119,732 is directed to a method for rapidly producing cheese. In this method, rennet, kid lipase, and calf lipase are mixed with milk during the fermenting period. The milk is then coagulated and cut into curd particles followed by processing by the normal procedure for producing cheddar cheese, which includes a whey draining step. The curd is formed into a cheese block and the cheese block is aged for about 10 weeks to provide an intense aged cheddar cheese flavor.

U.S. Pat. No. 3,975,544 describes a method for producing cheddar cheese from pasteurized milk wherein an enzyme mixture is added to cheddared curds to substantially reduce the curing time of the cheese block. The cheese blocks are cured for a period of one month at 10 to 25° C.

U.S. Pat. No. 4,244,971 is directed to a process for the rapid manufacture of cheese products. In the process, a cultured cheese component is prepared by proteolyzing milk protein and by lipolyzing milkfat and forming a mixed fermentate of these hydrolyzed materials. The mixed fermentate is combined with a cheese starter culture and fermented to provide the cultured cheese component. The cultured cheese component is then mixed with a milk protein concentrate and a fat concentrate. This mixture is fermented to provide a cheese material capable of being made into process cheese type products by conventional cheese cooking techniques.

Co-pending U.S. patent application Ser. No. 09/314,713, filed on May 19, 1999, now U.S. Pat. No. 6,251,445, and owned by the same assignee as the present application, provided a method for making enzyme-modified cheese flavorings in which treatment with a proteolytic enzyme occurred prior to any heating step, and in which the enzyme treatment was relatively short (i.e., normally less than about 12 hours). This process included the steps of: (i) contacting a dairy liquid containing whey protein with a proteolytic enzyme to provide a dairy reaction mixture; (ii) incubating the dairy reaction mixture at a temperature and for a period of time that are sufficient to partially hydrolyze proteins; (iii) pasteurizing the partially hydrolyzed dairy reaction mixture; (iv) contacting the pasteurized mixture with a composition comprising a lipase and a cheese culture and incubating for a time and at a temperature that are sufficient for cheese flavor to develop; and (v) treating the fermented mixture with heat sufficient to inactivate the culture, destroy microbial contaminants, and inactivate the enzymes; thereby providing the enzyme-modified cheese flavoring.

Co-pending U.S. patent application Ser. No. 09/141,082, filed on Aug. 27, 1998, now abandoned, and also owned by the same assignee as the present application, provided a method for producing a highly flavored component for use in cheese manufacture in a short period of time without utilizing a whey draining step or producing cheese curds. A cheese flavor precursor (i.e., an aqueous, acidified protein, and fat substrate) was prepared by mixing together a dried or concentrated protein source, a fat source, an acid source, and water. An enzyme system was then added to the substrate. The enzyme system included a lipase, a protease, and a peptidase. The substrate was then fermented for a time sufficient to provide a highly developed cheese flavor in the substrate. The substrate was then heated to a temperature and held at that temperature for a time sufficient to inactivate the enzyme system.

Although these methods generally provide highly flavored cheese components, they are generally limited to flavor profiles suitable for producing only a single type of flavored cheese. Thus, it is not possible to produce cheeses having widely differing and desirable flavor profiles using these methods. Moreover, none of these methods produce highly flavored cheese components having, or contributing to, sharp cheddar notes. It would be desirable, therefore, to provide a cheese flavoring system whereby cheeses having desirable and widely varying flavor profiles can be prepared. It would also be desirable to provide a cheese flavoring system which can duplicate a wide variety of desirable flavored cheeses using only a few flavoring components. It would also be desirable to provide a highly flavored cheese component having sharp cheddar notes. The present invention provides such cheese flavoring systems and a highly flavored cheese component having, or contributing to, sharp cheddar notes.

SUMMARY OF THE INVENTION

The present invention relates generally to a natural bio-generated cheese flavoring system which can be used to prepare cheeses having desired flavor profiles. More specifically, the present invention relates to a cheese flavoring system comprising a "sulfury-cheddar" flavored component, a "creamy-buttery" flavored component, and a "cheesy" flavored component. Each of these flavored components can be used as flavor building blocks with their own specific flavor profiles and/or characteristics. Using various combinations of these flavored components (i.e., the cultured cheese concentrate of this invention), cheeses having a wide variety of flavors can be produced. The flavored components are separately prepared from a highly concentrated milk substrate using enzymes, cultures, additives, and process conditions designed to provide flavor components having specific flavor profiles and/or characteristics. The flavor concentrates can be used to prepare process cheese or other cheeses with desired flavor profiles. The flavor concentrates can be added to the milk substrate used to produce the cheese, wherein the milk substrate is then treated to produce the desired cheese. Alternatively, the flavor concentrates can be added to a cheese or dairy base (i.e., a cheese curd and/or dairy solids lacking the desired flavor profile) to produce the desired cheese. The flavor concentrates can also be used as a natural flavoring system in other food products.

The present invention provides a flavoring system comprising a sulfury-cheddar flavor component, a creamy-buttery flavor component, and a cheesy flavor component, wherein the sulfury-cheddar flavor component is prepared by treating a first milk concentrate with a lactic acid culture, and optionally a lipolytic enzyme and a high proteolytic activity culture, at a temperature of about 70 to about 86° F. for about 10 to about 24 hours to obtain first mixture having a pH of about 5.4 or less, adding a sulfur-containing substrate to the first mixture to form a second mixture, treating the second mixture with a *Brevibacterium linens* culture or a yeast from the genera Debaromyces or Kluyeromyces, whereby the *Brevibacterium linens* culture or the yeast can convert the sulfur-containing substrate to sulfur-containing flavor compounds, at a temperature of about 65 to about 86° F. for about 3 to about 10 days to form a third mixture, and treating the third mixture at a temperature sufficient to inactivate the cultures and enzymes in the third mixture to form the sulfury-cheddar flavor component;

wherein the creamy-buttery flavor component is prepared by treating a second milk concentrate with a lactic acid culture, and optionally a lipolytic enzyme, at a temperature of about 70 to about 86° F. for about 10 to about 24 hours to form a fourth mixture, adding sodium citrate to the fourth mixture to form a fifth mixture, treating the fifth mixture with a diacetyl-producing flavor culture at about 70 to about 90° F. for about 1 to about 10 days to form a sixth mixture, and treating the sixth mixture at a temperature sufficient to inactivate the cultures and enzymes in the sixth mixture to form the creamy-buttery flavor component;

wherein the cheesy flavor component is prepared by treating a third milk concentrate with a lipase, a protease, and a peptidase at a temperature of about 60 to about 140° F. for about 0.5 to about 10 days to form a seventh mixture and treating the seventh mixture at a temperature sufficient to inactivate enzymes in the seventh mixture to form the cheesy flavor component; and wherein the sulfury-cheddar flavor component, the creamy-buttery flavor component, and the cheesy flavor component of the cheese flavoring system can be incorporated in varying amounts into food products to produce a wide variety of flavors. The present flavoring system is especially adapted for incorporation into a cheese or dairy base to produce cheese products.

The present invention also provides a cheese flavoring system comprising a sulfury-cheddar flavor component, a creamy-buttery flavor component, and a cheesy flavor component, wherein the sulfury-cheddar flavor component is prepared by treating a first milk concentrate with a lactic acid culture, optionally a lipolytic enzyme, optionally a high proteolytic activity culture, a sulfur-containing substrate, and a *Brevibacterium linens* culture or a yeast from the genera Debaromyces or Kluyeromyces, whereby the *Brevibacterium linens* culture or the yeast can convert the sulfur-containing substrate to sulfur-containing flavor compounds, at a temperature of about 65 to about 86° F. for about 3 to about 10 days to form a first mixture, and treating the first mixture at a temperature sufficient to inactivate cultures and enzymes in the first mixture to form the sulfury-cheddar flavor component;

wherein the creamy-buttery flavor component is prepared by treating a second milk concentrate with a lactic acid culture, optionally a lipolytic enzyme, a diacetyl-producing flavor culture, and sodium citrate at a temperature of about 70 to about 90° F. for about 1 to about 10 days to form a second mixture and treating the second mixture at a temperature sufficient to inactivate cultures and enzymes in the second mixture to form the creamy-buttery flavor component;

wherein the cheesy flavor component is prepared by treating a third milk concentrate with a lipase, a protease, and a peptidase at a temperature of about 60 to about 140° F. for about 0.5 to about 10 days to form a third mixture and treating the third mixture at a temperature sufficient to inactivate enzymes in the third mixture to form the cheesy flavor component; and wherein the sulfury-cheddar flavor component, the creamy-buttery flavor component, and the cheesy flavor component of the cheese flavoring system can be incorporated in varying amounts into a cheese or dairy base to produce cheeses having a wide variety of flavors.

The sharp cheddar flavor component or concentrate can also be used alone to replace aged flavored cheese in the manufacture of process cheese. Thus, the present invention also provides a process for producing a sharp cheddar flavor component or concentrate for use in cheese manufacture. This sharp cheddar flavor component or concentrate can be used alone to add specific flavor notes to natural cheese, especially to provide sharp cheddar notes to very young cheddar cheeses. Thus, this present invention also provides a sulfury-cheddar flavor component for use in cheese flavoring, wherein the sulfury-cheddar flavor component is prepared by treating a milk concentrate with a lactic acid culture, and optionally a lipolytic enzyme and a high proteolytic activity culture, at a temperature of about 70 to about 86° F. for about 10 to about 24 hours to obtain first mixture having a pH of about 5.4 or less, adding a sulfur-containing substrate to the first mixture to form a second mixture, treating the second mixture with a *Brevibacterium linens* culture or a yeast from the genera Debaromyces or Kluyeromyces, whereby the *Brevibacterium linens* culture or the yeast can convert the sulfur-containing substrate to sulfur-containing flavor compounds, at a temperature of about 65 to about 86° F. for about 3 to about 10 days to form a third mixture, and treating the third mixture at a temperature sufficient to inactivate enzymes in the third mixture to form the sulfury-cheddar flavor component.

Figure 1:
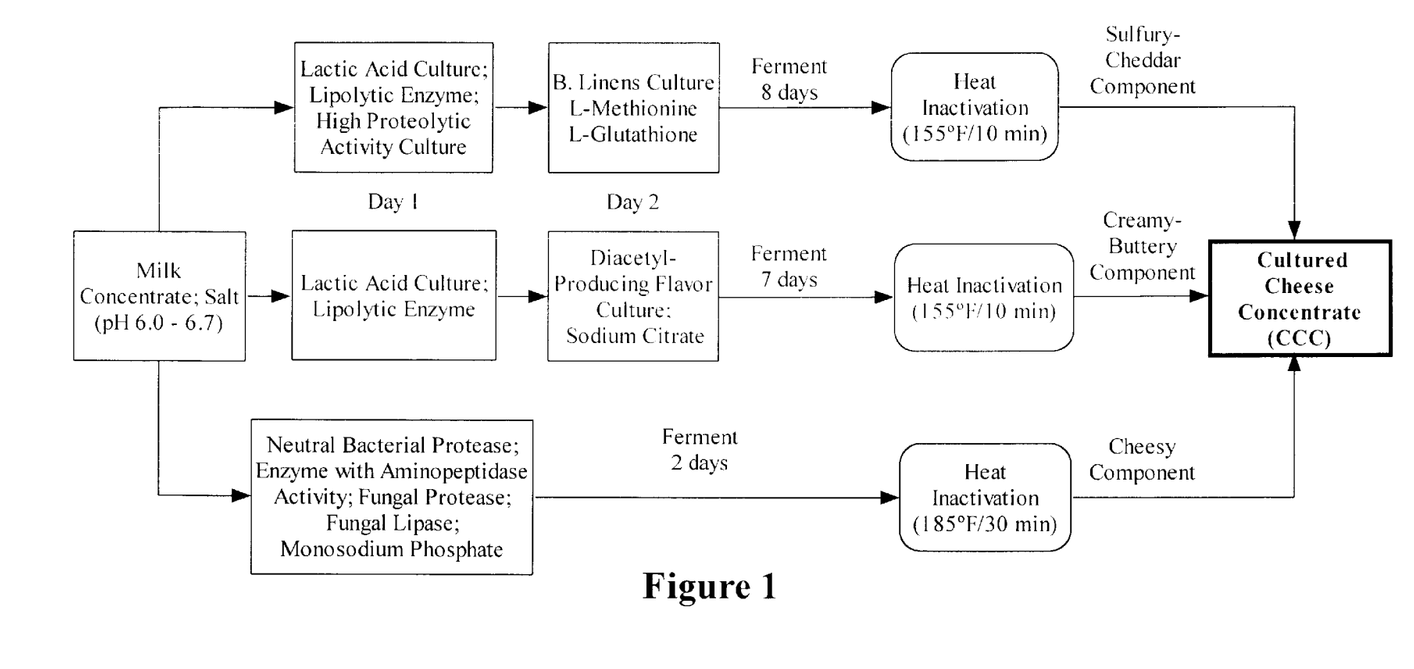
FIG. 1 illustrates the preparation of the cultured cheese concentrate containing the sulfury-cheddar flavor component, the creamy-butter flavor component, and the cheesy flavor component of the present invention.

In the method, the starting material is a milk concentrate comprising an aqueous protein and fat-containing mixture. The aqueous milk-derived concentrate (i.e., a highly concentrated milk system) generally has a total solids content of about 30 to about 50 percent, a protein content of about 10 to about 19 percent, a fat content of about 15 to about 30 percent, and a lactose content of about 0.5 to about 10 percent. Preferably, the aqueous milk-derived concentrate has a total solids content of about 35 to about 47 percent, a protein content of about 12 to about 17 percent, a fat content of about 18 to about 25 percent, and a lactose content of about 0.5 to about 5 percent. Preferably, the aqueous milk-derived concentrate or substrate is a fluid milk concentrate prepared by ultrafiltration/diafiltration (UF/DF) or a reconstituted milk substrate prepared from a mixture of UF/DF milk powder and milkfat. As shown in FIG. 1, the fluid milk concentrate is then divided into three portions, each of which is treated (i.e., fermented) with specific flavor enzymes, cultures, adjuncts, and other additives for a predetermined period of time sufficient to develop specific flavor characteristics. Using this method, a "sulfury-cheddar" component, a "creamy-buttery" component, and a "cheesy" component can be produced. Each portion is then heated to a temperature and held at that temperature for a time sufficient to inactivate the enzyme/culture systems used to prepare the specific flavoring component. Although it is generally preferred, largely for convenience, that the same or similar milk concentrate composition is used to prepare each of the three flavor components of the present cheese flavoring system, separate milk concentrate compositions can be used to prepare each of the three flavor components if desired.

After the heat inactivation steps, the three flavored components or substrates can be used separately or can be combined in groups of two or three to provide the desired highly flavored cultured concentrate. If desired, the sulfury-cheddar component, which has strong sulfur notes, can be used alone to provide sharp cheddar flavor notes. Preferably, however, the flavoring systems employs all three flavored components in varying amounts to provide a wide variety of flavored cheeses. The flavored components or concentrates can be used directly or can be dried (e.g., spray dried) to produce highly flavored cheese/dairy powders.

Either the flavored concentrates or cheese powders can be used to prepare a wide variety of flavored cheeses. This invention also provides a method of preparing a flavored cheese using a cultured cheese concentrate, said method comprising:

(1) preparing a cheese base;

(2) incorporating about 1 to about 10 percent of the cultured cheese concentrate into the cheese base to form the flavored cheese;

wherein the cultured cheese concentrate comprises 0 to about 80 percent of a sulfury-cheddar flavor component, about 10 to about 90 percent of a creamy-buttery flavor component, and about 10 to about 90 percent of a cheesy flavor component;

wherein the sulfury-cheddar flavor component is prepared by treating a first milk concentrate with a lactic acid culture, and optionally a lipolytic enzyme and a high proteolytic activity culture, at a temperature of about 70 to about 86° F. for about 10 to about 24 hours to obtain first mixture having a pH of about 5.4 or less, adding a sulfur-containing substrate to the first mixture to form a second mixture, treating the second mixture with a

*Brevibacterium linens* culture or a yeast from the genera Debaromyces or Kluyeromyces, whereby the *Brevibacterium linens* culture or the yeast can convert the sulfur-containing substrate to sulfur-containing flavor compounds, at a temperature of about 65 to about 86° F. for about 3 to about 10 days to form a third mixture, and treating the third mixture at a temperature sufficient to inactivate cultures and enzymes in the third mixture to form the sulfury-cheddar flavor component;

wherein the creamy-buftery flavor component is prepared by treating a second milk concentrate with a lactic acid culture, and optionally a lipolytic enzyme, at a temperature of about 70 to about 86° F. for about 10 to about 24 hours to form a fourth mixture, adding sodium citrate to the fourth mixture to form a fifth mixture, treating the fifth mixture with a diacetyl-producing flavor culture at about 70 to about 90° F. for about 1 to about 10 days to form a sixth mixture, and treating the sixth mixture at a temperature sufficient to inactivate the cultures and enzymes in the sixth mixture to form the creamy-buttery flavor component;

wherein the cheesy flavor component is prepared by treating a third milk concentrate with a lipase, a protease, and a peptidase at a temperature of about 60 to about 140° F. for about 0.5 to about 10 days to form a fifth mixture and treating the fifth mixture at a temperature sufficient to inactivate enzymes in the fifth mixture to form the cheesy flavor component; and wherein the amounts of the sulfury-cheddar flavor component, the creamy-buttery flavor component, and the cheesy flavor component in the cultured cheese concentrate and the amount of cultured cheese concentrate incorporated into the cheese base can be adjusted to obtain flavored cheeses having a wide variety of flavors.

The present invention also provides a method of preparing a flavored cheese using a cultured cheese concentrate, said method comprising:

(1) preparing a milk substrate suitable for producing a cheese;

(2) incorporating about 1 to about 10 percent of the cultured cheese concentrate into the milk substrate;

(3) treating the milk substrate and cultured cheese concentrate to set the milk substrate;

(4) cutting the set milk substrate to form curds and whey;

(5) cooking the curds and whey;

(6) separating the curds from the whey; and (7) forming the flavored cheese from the separated curds;

wherein the cultured cheese concentrate comprises 0 to about 80 percent of a sulfury-cheddar flavor component, about 10 to about 90 percent of a creamy-buttery flavor component, and about 10 to about 90 percent of a cheesy flavor component;

wherein the sulfury-cheddar flavor component is prepared by treating a first milk concentrate with a lactic acid culture, and optionally a lipolytic enzyme and a high proteolytic activity culture, at a temperature of about 70 to about 86° F. for about 10 to about 24 hours to obtain first mixture having a pH of about 5.4 or less, adding a sulfur-containing substrate to the first mixture to form a second mixture, treating the second mixture with a *Brevibacterium linens* culture or a yeast from the genera Debaromyces or Kluyeromyces, whereby the *Brevibacterium linens* culture or the yeast can convert the sulfur-containing substrate to sulfur-containing flavor compounds, at a temperature of about 65 to about 86° F. for about 3 to about 10 days to form a third mixture, and treating the third mixture at a temperature sufficient to inactivate cultures and enzymes in the third mixture to form the sulfury-cheddar flavor component;

wherein the creamy-buttery flavor component is prepared by treating a second milk concentrate with a lactic acid culture, and optionally a lipolytic enzyme, at a temperature of about 70 to about 86° F. for about 10 to about 24 hours to form a fourth mixture, adding sodium citrate to the fourth mixture to form a fifth mixture, treating the fifth mixture with a diacetyl-producing flavor culture at about 70 to about 90° F. for about 1 to about 10 days to form a sixth mixture, and treating the sixth mixture at a temperature sufficient to inactivate the cultures and enzymes in the sixth mixture to form the creamy-buttery flavor component;

wherein the cheesy flavor component is prepared by treating a third milk concentrate with a lipase, a protease, and a peptidase at a temperature of about 60 to about 140° F. for about 0.5 to about 10 days to form a fifth mixture and treating the fifth mixture at a temperature sufficient to inactivate enzymes in the fifth mixture to form the cheesy flavor component; and wherein the amounts of the sulfury-cheddar flavor component, the creamy-buttery flavor component, and the cheesy flavor component in the cultured cheese concentrate and the amount of cultured cheese concentrate incorporated into the milk substrate can be adjusted to obtain flavored cheeses having a wide variety of flavors.

DETAILED DESCRIPTION OF THE INVENTION

In the present method, the starting material is a milk concentrate or substrate in the form of an aqueous protein and fat-containing mixture. As noted above, although it is generally preferred, largely for convenience, that the same or similar milk concentrate composition is used to prepare each of the three flavor components of the present cheese flavoring system, separate milk concentrate compositions can be used to prepare each of the three flavor components if desired. The aqueous milk-derived concentrate or concentrates (i.e., highly concentrated milk system) generally have total solids contents of about 30 to about 50 percent, protein contents of about 10 to about 19 percent, fat contents of about 15 to about 30 percent, and lactose contents of about 0.1 to about 10 percent. Preferably, the aqueous milk-derived concentrates have total solids contents of about 35 to about 47 percent, protein contents of about 12 to about 17 percent, fat contents of about 18 to about 25 percent, and lactose contents of about 0.5 to about 5 percent. The moisture levels of the substrate are generally from about 50 to about 70 percent, preferably from about 53 to about 65 percent. The protein source can be a dried protein or concentrated material and is preferably a dairy ingredient, such as milk protein concentrate, fractionated milk protein, concentrated milkfat, whey protein concentrate, dried whey, non-fat dry milk, or mixtures thereof. The fat source is preferably a milkfat such as anhydrous milkfat, butter, cream, or mixtures thereof. Other protein sources, such as soy protein, corn protein, wheat protein, and/or rice protein can be used. Other non-dairy fat sources, such as vegetable oil, can be used. The pH of the milk concentrate or substrate is generally in the range of about 6 to about 7 and preferably in the range of about 6.5 to about 6.7.

A dried protein source, if used, is reconstituted with water. The water is used at a level sufficient to provide a total moisture of from about 50 to about 70 percent, preferably from about 53 to about 65 percent in the substrate. The reconstituted protein source is combined with the fat source to provide the substrate. If necessary, the pH of the substrate can be lowered to the proper range (i.e., about 4.6 to about 6.0 and preferably about 4.8 to about 5.6) by the addition of an edible acid or by use of a lactic acid producing microorganism. Suitable edible acids are non-toxic, inorganic or organic acids, which include hydrochloric acid, acetic acid, maleic acid, tartaric acid, citric acid, phosphoric acid, lactic acid, and mixtures thereof. In preparing the milk concentrate, a homogenization device can be used, if desired and/or necessary, to reduce the fat droplet particle size and insure homogeneity of the substrate.

Preferably, the aqueous milk-derived concentrate or substrate is a fluid milk concentrate prepared by ultrafiltration (alone or even more preferably combined with diafiltration) or a reconstituted milk substrate prepared from a mixture of an ultrafiltered (UF) or ultrafiltered/diafiltered (UF/DF) milk powder and milkfat. Preferably, the starting material is an UF/DF milk having the following characteristics:

|  | Typical (%) | Preferred (%) | More Preferred (%) |
|---|---|---|---|
| Total Solids | 30–50 | 35–47 | 40 |
| Moisture | 50–70 | 53–65 | 60 |
| Fat | 15–30 | 18–25 | 21 |
| Protein | 10–19 | 12–17 | 14.5 |
| Lactose | 0.1–10 | 0.5–5 | 1 |
| Salt | 1–3 | 1–2 | 1–2 |
| Ash | 0.5–25 | 1–2 | 1–2 |
| pH | 6–7 | 6.5–6.7 | 6.6 |

Preferred starting materials can prepared from mixtures of pasteurized whole or skim milk with added cream (0 to about 20 percent, preferably about 2 to about 15 percent). The milk substrate is then heated to about 110 to about 140° F., preferably to about 120° F., in a heat exchanger and then subjected to conventional ultrafiltration/dilfration techniques to produce an about 3× to about 8× (preferably about 5×) milk concentrate product. After heating at, for example, 168° F. for about 16 seconds and cooling to about 70 to about 80° F., the milk concentrate substrate can be used to prepare the specific flavoring components of the present invention. Preferably, about 1 to about 2 percent salt is added to the milk concentrate substrate prior to treatment with the various enzymes/cultures/additives to produce the specific flavoring components. The milk concentrate is a relatively viscous liquid, preferably containing about 35 to about 47 percent solids.

As shown in FIG. 1, the fluid milk concentrate, preferably containing about 1 to about 2 percent salt, is then divided into three portions, each of which is treated (i.e., fermented) with specific enzymes, cultures, adjuncts, and other additives for predetermined time periods sufficient to develop specific flavor characteristics. Specific enzymes, cultures, adjuncts, and other additives are provided from which a "sulfury-cheddar" component, a "creamy-buttery" component, and a "cheesy" component can be produced. Although not shown in the Figure, each component stream can be subjected to an optional homogenization step before or after fermentation. After fermentation, each portion is then heated to a temperature and held at that temperature for a time sufficient to inactivate the culture and enzyme systems.

After the heat inactivation steps, the three flavored components or substrates can be used separately or can be combined in groups of two or three to provide the desired highly flavored cultured cheese concentrate. Preferably, the cultured cheese concentrate of this invention contains 0 to about 80 percent of the sulfury-cheddar component, about 10 to about 90 percent of the creamy-buttery component, and about 10 to about 90 percent of the cheesy component. More preferably, the cultured cheese concentrate of this invention contains about 25 to about 75 percent of the sulfury-cheddar component, about 25 to about 75 percent of the creamy-buttery component, and about 25 to about 75 percent of the cheesy component. The cultured cheese concentrate can be a physical blend of the components which blend is then used to prepared the desired flavored cheese. Alternatively, the cultured cheese concentrate can be formed by individually adding the components to the cheese substrate; the resulting composition is then used to prepare the desired flavored cheese.

As illustrated in Example 5, the flavor building block materials (i.e., the three flavor components) can be added to a milk substrate which is then used to form a cheese. Alternatively and as illustrated in Example 6, the flavor building block materials can be added to an already prepared cheese base. The relative amounts of three components in the cultured cheese concentrate, as well as the total amount of cultured cheese concentrate incorporated, can be varied to achieve particular flavor combinations or flavor notes depending on the desired flavor characteristics. Using the three components and a cheese base, a wide variety of cheese types can be prepared as illustrated in the following Table 1:

TABLE 1

Illustrative Cheeses Prepared Using the Cultured Cheese Concentrate of the Present Invention

| Cheese | Cultured Cheese Concentrate (Parts By Weight) | | |
|---|---|---|---|
|  | Sulfury-Cheddar | Creamy-Buttery | Cheesy |
| Process Cheese | 1.7 | 7 | 1.3 |
| Cream Cheese | 0 | 8 | 2 |
| Cheddar    Medium | 1 | 6 | 3 |
|            Sharp | 3.3 | 3.3 | 3.3 |
|            Extra-Sharp | 6 | 1 | 3 |
| Mozzarella | 0 | 7.5 | 2.5 |
| Parmesan | 1 | 3 | 6 |
| Romano | 1 | 1 | 8 |

Generally, the resulting cheeses contain about 1 to about 10 percent of the cultured cheese concentrate and preferably about 2 to about 6 percent. Of course, as those skilled in the art will realize, both the relative and total amounts of the various components can be modified and/or optimized to achieve a particularly desired flavor profile. Additionally, these three components can be used to obtain other flavored cheeses and can be used in various cheese bases (e.g., process cheeses, process cheese-type food products, natural cheeses, cream cheeses, cottage cheeses, and the like).

As noted above and shown in FIG. 1, the fluid milk concentrate is divided into three portions, each of which is treated (i.e., fermented) with specific enzymes, cultures, adjuncts, and other additives for a predetermined period of time sufficient to develop specific flavor characteristics. Specific enzymes, cultures, adjuncts, and other additives are provided from which the "sulfury-cheddar" component, the "creamy-buftery" component, and the "cheesy" component can be produced. The processes for preparing these components do not require whey drainage steps. The preparation of each of the flavor components will now be described.

Sulfury-Cheddar Component. The preparation of the sulfury-cheddar component is preferably carried out in a two stage process as illustrated in FIG. 1. In the first stage, a lactic acid culture is added to the milk substrate and are maintained at about 70 to about 86° F. for about 10 to about 24 hours to obtain a pH of about 5.4 or less. Preferably, a lipolytic enzyme and a high proteolytic activity culture or protease enzyme are also added with the lactic acid culture in the first stage. Then a *Brevibacterium linens* culture or a yeast from the genera Debaromyces or Kluyeromyces and a sulfur-containing substrate, whereby the culture or yeast can convert the sulfur-containing substrate to organoleptically potent sulfur-containing flavor compounds is added and the fermentation continued for about 3 to 10 additional days at a temperature of about 65 to about 86° F. (preferably at about 72° F.). Preferably the *Brevibacterium linens* culture is used to form the sulfur-containing compounds. There should not be any heat inactivation of enzymes/cultures between the two fermentation stages. The enzymes can be produced from various microorganisms or extracted from plant or animal tissues. The various enzymes of the enzyme system are available commercially as dry powders or in liquid form. Preferably, both stages are carried out in a single vessel. Preferably, the reaction mixture is subject to aeration during fermentation to prevent anaerobic conditions and to provide good mixing. Generally, conditions should be maintained to minimize phase separation during fermentation. If phase separation does occur, an optional homogenization step can be used after fermentation. After completion of the two fermentation steps or stages, the cultures and enzymes are inactivated by heating to about 145 to about 190° F. for about 16 seconds to about 30 minutes, preferably to about 155° F. for about 10 minutes. Preferably, the reaction mixture is recirculated during inactivation to improve heat transfer.

As noted, the *Brevibacterium linens* culture is preferably used to form the sulfur-containing compounds. If desired, a microorganism genetically modified so as to provide similar *Brevibacterium linens* activity can be used in place of the *Brevibacterium linens* culture. For purposes of this invention, such a genetically modified microorganism is considered to be included within the term "*Brevibacterium linens* culture."

For purposes of this invention, the "sulfur-containing substrates" are sulfur-containing free amino acids, tripeptides containing sulfur-containing amino acids, and protein hydrolystates containing sulfur-containing amino acids. Suitable food protein hydrolysates are available, for example, from Quest International (Hoffman Estates, Illinois) under tradenames N-Z-Amine, N-Z-Case, Hy-Case, and Pepticase, as well as from other suppliers. Preferably, the sulfur-containing substrates includes L-methionine, L-glutathione, and L-cysteine. In especially preferred embodiments, the sulfur-containing substrate is a mixture of L-methionine and L-glutathione, a mixture of L-methionine and L-cysteine, or a mixture of L-methionine, L-glutathione, and L-cysteine. The sulfur-containing substrates are generally added at a level of about 0.01 to about 1 percent.

In a particular preferred embodiment, the sulfury-cheddar component is prepared by treating the milk concentrate (pH about 6.0 to about 6.7) with a lactic acid culture, a lipolytic enzyme, and a high proteolytic activity culture in a first stage and then, without any inactivation, further treating with a Brevibacterium linens culture with added L-methionine and L-glutathione, added L-methionine and L-cysteine, or added L-methionine, L-glutathione, and L-cysteine. The first stage is carried out for about 10 to about 24 hours at a temperature of about 70 to about 86° F. The second stage is carried out for about 1 to 10 days, preferably for about 4 to about 8 days, at a temperature of about 70 to about 86° F. Although it is preferred that the two stages be carried out sequentially as shown in FIG. 1, they may be combined into a single fermentation step. Such a single stage fermentation process is generally carried out at about 65 to about 86° F. for about 3 to about 10 days.

An especially preferred composition for preparing the sulfury-cheddar component is described in the following Table 2. Example 1 illustrates the preparation of the sulfury-cheddar component using the ingredients and "typical" levels listed in Table 2.

TABLE 2

Especially Preferred Composition for Preparing Sulfury-Cheddar Component

| Ingredient | Range (%) | Typical (%) | Function |
|---|---|---|---|
| 5X UF/DF Milk | balance | 98.78 | milk substrate |
| First Stage | | | |
| Pregastric esterase | 0–1 | 0.02 | lipolytic enzyme for hydrolysis of fat to free fatty acids |
| Lactococcus lactis and Lactococcus lactis ssp. cremoris | 0.001–2 | 0.01 | starter culture to convert lactose to lactic acid and decrease pH |
| Micrococcus | 0.0001–1 | 0.001 | flavor adjunct culture with high proteloytic activity to convert casein to peptides |
| Second Stage | | | |
| Brevibacterium linens | 0.001–2 | 0.01 | flavor adjunct culture to produce sulfur flavor compounds |
| L-methionine | 0.01–1 | 0.1 | amino acid substrate for sulfur compound generation |
| L-glutathione | 0.01–1 | 0.1 | tri-peptide substrate and processing aid to create redox equilibrium conditions for flavor development; hydrolyzed to free amino acids |

Other sulfur-containing substrates, if used, are generally present in a level of about 0.01 to about 1 percent. Fermentation is preferably carried out with aeration to prevent the reaction mixture from becoming anaerobic and to provide good mixing. Aeration is preferably effected using air introduced into the reaction mixture using a diffusion plate or an in-line air sparger. If appropriate (i.e., if phase separation occurs), the reaction mixture can optionally be homogenized prior to further treatment. After fermentation, the cultures and enzymes are inactivated by heating at about 150 to about 185° F. for about 16 seconds to about 30 minutes; preferably, aeration is discontinued throughout the heat inactivation process.

The sulfur-containing substrates are added to assist in the production of sulfur compounds important in cheddar, especially sharp cheddar, flavor development. Preferred sulfur-containing substrates include L-methionine, L-glutathione, L-cysteine, and mixtures thereof. The L-methionine is used for sulfur compound generation through the action of the *Brevibacterium linens* culture or the yeast (preferably *Brevibacterium linens*). The tri-peptide L-glutathione (i.e., glutamine-cysteine-glycine) and the amino acid L-cysteine, in addition to serving as substrates, also act as processing aids to create redox equilibrium conditions which facilitate flavor production by the generation of desirable sulfur flavor compounds (i.e., methanethiol, dimethyidisulfide, and dimethyltrisulfide). Hydrolysis of L-glutathione to free amino acids by microbial enzymes is expected during the fermentation period. Further hydrolysis may also occur during subsequent heat treatment (i.e., during inactivation and/or incorporation into cheese base). Generally, expected levels of L-glutathione in the final cheese product (i.e., the flavored cheese product produced with the present cheese flavor system) are less than about 10 ppm.

The resulting sulfury-cheddar component which is produced is typically a liquid or paste with a moisture content in the range of from about 50 to about 70 percent, preferably from about 53 to about 65 percent. The sulfury-cheddar component can be spray dried to provide a powder with or without the addition of carrier materials, such as whey concentrate or maltodextrins. The sulfury-cheddar component generally has the following flavor characteristics/profile shown in Table 3. The sulfury-cheddar component likely contains other potent aroma or flavor compounds, including sulfur-containing compounds, which have not been detected.

TABLE 3

Typical Flavor Profile for Sulfury-Cheddar Component.

| | Range | Typical |
|---|---|---|
| Methanethiol* | 700–15M | 3.7M |
| Dimethyldisulfide* | 1M–50M | 9.7M |
| Dimethyltrisulfide* | 1M–50M | 6.9M |
| Acetic acid | 500–1500 ppm | 916 ppm |
| Propionic acid | <25–100 ppm | <25 ppm |
| Butyric acid | 100–500 ppm | 285 ppm |
| Hexanoic acid | 10–200 ppm | 92 ppm |
| Octanoic acid | 10–200 ppm | 45 ppm |
| Decanoic acid | 10–200 ppm | 64 ppm |
| Dodecanoic acid | 10–200 ppm | 82 ppm |

*Sulfur compounds are reported in peak value areas as determined using gas chromatography; M = million.
The initial peak value areas for these sulfur compounds was essentially zero.

Creamy-Buttery Component. The preparation of the creamy-buttery component is preferably carried out in a two stage process as illustrated in FIG. 1. The preparation of the creamy-buttery component is carried out by adding a lactic acid culture to the milk concentrate and then fermenting the mixture at about 70 to 86° F. for about 10 to about 24 hours. Preferably, a lipolytic enzyme is also added to the milk concentrate along with the lactic acid culture. A diacetyl-producing flavor culture and sodium citrate are then added and the fermentation continued at about 70 to about 90° F., preferably about 82° F., for about 1 to about 10 days, preferably about 5 to about 8 days. The enzymes can be produced from various microorganisms or extracted from plant or animal tissues. The various enzymes of the enzyme system are available commercially as dry powders or in liquid form. Preferably, the reaction mixture is subject to aeration during fermentation to prevent anaerobic conditions and to provide good mixing. Phase separation does is not a significant problem during fermentation. After completion of the fermentation step, the cultures and enzymes are inactivated by heating to about 145 to about 190° F. for about 16 seconds to about 30 minutes, preferably to about 155° F. for about 10 minutes.

In a particular preferred embodiment, the creamy-buttery component is prepared by treating the milk concentrate (pH about 6.0 to about 6.7) with a lactic acid culture and a pregastric esterase in a first stage and then, without any inactivation, adding sodium citrate (generally about 0.05 to about 5 percent) and further treating with one or more cultures which have the ability to produce diacetyl from citrate. Preferred diacetyl-producing cultures include Leuconostoc and *Lactococcus lactis* ssp. *lactis* biovar. *diacetylactis*. The first stage fermentation is carried out for about 10 to about 24 hours at a temperature of about 70 to about 86° F. The second stage is carried out for about 1 to about 10 days at a temperature of about 70 to about 90° F. Although it is preferred that the two stages be carried out sequentially as shown in FIG. 1, they may be combined into a single fermentation step. Such a single stage fermentation process is generally carried out at a temperature of about 70 to 90° F. for about 1 to about 10 days.

As noted, the Leuconostoc and *Lactococcus lactis* ssp. *lactis* biovar. *diacetylactis* cultures are the preferred diacetyl-producing flavor cultures. If desired, a microorganism genetically modified so as to provide similar activity can be used in place of the Leuconostoc and/or *Lactococcus lactis* ssp. *lactis* biovar. *diacetylactis* cultures. For purposes of this invention, such a genetically modified microorganism is considered to be included within the term "diacetyl-producing flavor cultures."

An especially preferred composition for preparing the creamy-buttery component is described in the following Table 4. Example 2 illustrates the preparation of the creamy-buttery component using the ingredients and "typical" levels listed in Table 2.

TABLE 4

Especially Preferred Composition for Preparing Creamy-Buttery Component

| Ingredient | Range (%) | Typical (%) | Function |
|---|---|---|---|
| 5X UF/DF Milk | balance | 99.83 | milk substrate |
| First Stage | | | |
| Pregastric esterase | 0–1 | 0.02 | lipolytic enzyme for hydrolysis of fat to free fatty acids |
| *Lactococcus lactis* and *Lactococcus lactis* ssp. *cremoris* | 0.001–2 | 0.01 | starter culture to convert lactose to lactic acid and decrease pH |
| Second Stage | | | |
| Sodium Citrate | 0.01–10 | 0.3 | substrate for diacetyl production and flavor generation |
| Leuconostoc | 0–1 | 0.0001 | flavor adjunct culture for production of diacetyl from citrate |
| *Lactococcus lactis* ssp. *lactis* biovar. *diacetylactis* | 0–1 | 0.0001 | flavor adjunct culture for production of diacetyl from citrate |

After fermentation, the cultures and enzymes are inactivated by heating at about 145 to about 190° F. for about 16 seconds to about 30 minutes, preferably to about 155° F. for about 10 minutes. Preferably, aeration is not used during or after the heat inactivation process.

The resulting creamy-buttery component which is produced is typically a liquid or paste with a moisture content in the range of from about 50 to about 70 percent, preferably from about 53 to about 65 percent. The creamy-buttery component can be spray dried to provide a powder with or without the addition of carrier materials, such as whey concentrate or maltodextrins. The creamy-buttery component generally has the flavor characteristics/profile shown in Table 5. The creamy-buttery component likely contains other potent aroma or flavor compounds which have not been detected.

TABLE 5

Typical Flavor Profile for Creamy-Buttery Component.

|  | Range (ppm) | Typical (ppm) |
| --- | --- | --- |
| Ethanol | 1–150 | 41 |
| Acetone | 1–5 | 2 |
| Diacetyl | 20–400 | 176 |
| Acetic acid | 400–1000 | 660 |
| Propionic acid | <25–100 | <25 |
| Butyric acid | 200–500 | 275 |
| Hexanoic acid | 20–150 | 86 |
| Octanoic acid | 10–100 | 30 |
| Decanoic acid | 50–150 | 86 |
| Dodecanoic acid | 50–150 | 106 |

Cheesy Component. The cheesy component can generally be prepared using the starting materials and procedures described in co-pending U.S. patent application Ser. No. 09/141,082, filed on Aug. 27, 1998, which is hereby incorporated by reference. The enzyme system used to prepare the cheesy component includes a lipase, a protease, and a peptidase. The substrate is treated with the enzyme system at a temperature of from about 60 to about 140° F. for a period of from about 0.5 to about 10 days, preferably from about 1 to about 3 days, to reach the desired cheesy flavor level. The enzymes can be produced from various microorganisms or extracted from plant or animal tissues. The various enzymes of the enzyme system are available commercially as dry powders or in liquid form.

Lipase (sometimes referred to as an esterase) is an enzyme which is well known in the art. Lipase are typically derived from the gullet tissues of young animals (calves, kids, or lambs), from the pancreas of adult animals, or from microbial sources. Various commercial preparations derived from gullet tissue are available from SKW BioIndustries, Marschall Laboratory, or other such companies under various trade names. The enzyme can be manufactured by grinding edible gullet with salt and non-fat dry milk, drying the mixture, and grinding again. Microbial sources of lipase are, for example, the molds *Candida cylindracea* Type VII, *Aspergilus oryzae, A. niger, Pencillium roqueforti, P. glaucum,* and *Rhizopus oryzae.*

In preparing the cheesy component, a powdered lipase (preferably a fungal lipase) is generally used at a level of about 0.05 to about 0.4 percent. A suitable fungal lipase is commercially available from Biocatalysts under the tradename Lipomod 187.

Proteases are enzymes which can be derived from fungal, plant, or animal sources, as is well-known in the art. Examples of suitable proteases include Enzeco Neutral Bacterial Protease 2X available from Enzyme Development Corp. and Promod 215 available from Biocatalyst. The powdered proteases are generally used at levels of from about 0.01 to about 1 percent, preferably at levels of from 0.1 to about 0.4 percent.

An enzyme with peptidase activity, preferably amino peptidase activity, is used in the enzyme system; such enzymes act upon bitter flavored peptides that result from protein hydrolysis. The peptidase enzyme in concert with the protease enzyme creates a high concentration of free amino acids and small peptides which contribute to the cheese flavor. The peptidase can be a purified enzyme material or can be cells of a microbe which produces peptidase activity, such as *Lactobacillus helveticus.* The culture cells can be spray dried, freeze dried, frozen, or freshly cultured cells and can be non-growing or capable of propagation within the substrate. Spray dried *Lactobacillus helveticus* cells are used at a level of from about 0.01 to about 3 percent, preferably from about 0.05 to about 0.30 percent. The preferred enzymes are powders. However, suitable liquid forms of these enzymes would be acceptable for use in this invention.

The substrate is treated with the enzyme system for a period of from about 0.5 to about 10 days, preferably from about 1 to about 3 days, to reach the desired cheesy flavor level. The treatment is conducted at a temperature of from about 60 to about 140° F. The desired flavor level can be judged organoleptically and can be estimated through analytical measurements, such as pH, titratable acidity, and concentration of free fatty acids and amino acids. When the target flavor is reached, the enzymes are deactivated by heating the mixture to a temperature of from about 160 to about 210° F. and holding the substrate at the elevated temperature for a sufficient time to insure complete enzyme deactivation (e.g., from about 5 to about 60 minutes).

The enzymes may be added sequentially or all at once to provide desired flavor profile. In the sequential addition of the enzymes, one or more of the enzymes is added and a treatment period of from about 4 hours to about 5 days is conducted. The remaining enzymes are then added and the treatment continues for further predetermined time of from about 0.5 to about 5 days. There is no inactivation step between the sequential addition of the enzymes.

In another embodiment of the invention, a first enzyme treatment takes place at a relatively high temperature of from about 120 to about 140° F. At least one of the enzymes is added and is incubated at this temperature for a first treatment of from about 2 to about 6 hours. The remaining enzymes are then added for a second treatment period of from about 6 hours to about 10 days which takes place at a temperature of from about 60 to about 140° F.

The process can be, and preferably is, conducted in a single vessel without transfer to additional vessels for sequential steps. The vessel is preferentially provided with mixing equipment to insure good contact between the enzymes and the substrate materials and to maintain the solids in suspension. A scraped surface mixing tank is preferred. A recirculation and homogenization device may be employed to prevent segregation of a fat phase from aqueous materials and to aid in maintaining the solids in suspension. Water may be added during the fermentation to maintain desired moisture content and acidic or basic materials may be added to adjust the pH.

In a particular preferred embodiment, the cheesy component is prepared by treating the milk concentrate (pH about 6.0 to about 6.7) with added monsodium phosphate with a neutral bacterial protease, an enzyme with aminopeptidase acitvity, a fungal protease, and a fungal lipase for about two days at a temperature of about 100 to about 110° F. as shown in FIG. 1.

An especially preferred composition for preparing the cheesy component is described in the following Table 6.

Example 3 illustrates the preparation of the cheesy component using the ingredients and "typical" levels listed in Table 2.

TABLE 6

Especially Preferred Composition for Preparing Cheesy Component

| Ingredient | Range (%) | Typical (%) | Function |
|---|---|---|---|
| 5X UF/DF Milk | balance | 98.2 | milk substrate |
| Monosodium Phosphate | 0.1–3 | 1.0 | emulsifier to aid in maintaining solids in suspension |
| Neutral bacterial protease (Enzeco Neutral Bacteriai Protease 2X, Enzyme Development Corp.) | 0.01–1 | 0.15 | neutral bacterial protease for hydrolysis of milk proteins to polypeptides, peptides, and amino acids for flavor generation |
| Lactobacillus helveticus (EnzoBact, Medipharm) | 0.01–3 | 0.14 | debittering agent; aminopeptidase activity |
| Fungal Protease (Promod 215, Biocatalysts) | 0.01–1 | 0.28 | proteolytic enzyme for hydrolysis of milk proteins to polypeptides, peptides, and amino acids for flavor generation |
| Fungal Lipase (Lipomod 187, Bio-catalysts) | 0.01–1 | 0.12 | lipase enzyme for hydrolysis of fat to free fatty acids and development of lipolytic flavor notes |
| Sorbic Acid | 0.01–0.5 | 0.1 | mold inhibitor |

Fermentation is preferably carried out with recirculation using a shear pump to prevent the reaction mixture from becoming anaerobic and to provide good mixing. After fermentation, the enzymes are inactivated by applying heat (generally about 185° F. for about 30 minutes); preferably, recirculation is continued throughout the heat inactivation process but without using the shear pump. The preferred cheesy component prepared with the ingredients in the above Table generally has improved flavor characteristics (i.e., a stronger cheesy "bite") than similar components prepared using the specific starting materials and procedures described in co-pending U.S. patent application Ser. No. 09/141,082.

The resulting cheesy component which is produced is typically a liquid or paste with a moisture content in the range of from about 50 to about 70 percent, preferably from about 53 to about 65 percent. The cheesy component can be spray dried to provide a powder with or without the addition of carrier materials, such as whey concentrate or maltodextrins. The cheesy component generally has the flavor characteristics/profile shown in Table 7. The cheesy component likely contains other potent aroma or flavor compounds which have not been detected.

TABLE 7

Typical Flavor Profile for Cheesy Component.

| | Range | Typical |
|---|---|---|
| Gel Profile | 9–34k (100%) | 9–11k (100%) |
| Protease activity | 4–25 Fl. intensity units/min/g | 9.66 Fl. intensity units/min/g |
| Acetic acid | 10–100 ppm | 35 ppm |
| Propionic acid | <25 ppm–100 | <100 ppm |
| Butyric acid | 2000–7000 ppm | 5823 ppm |
| Hexanoic acid | 1000–6000 ppm | 3254 ppm |
| Octanoic acid | 1000–4000 ppm | 2922 ppm |

TABLE 7-continued

Typical Flavor Profile for Cheesy Component.

| | Range | Typical |
|---|---|---|
| Decanoic acid | 4000–10000 ppm | 6230 ppm |
| Dodecanoic acid | 4000–10000 ppm | 7145 ppm |

The following examples further illustrate various features of the invention, but are intended to in no way limit the scope of the invention as set forth in the appended claims. Unless otherwise noted, all percentages and ratios are by weight. All reference cited in the present specification are hereby incorporated by reference.

Example 1

This example illustrates the preparation of the sulfury-cheddar component. Fresh whole milk was combined with fresh cream in an amount sufficient to obtain a standardized milk with a fat content of about 54 percent based on dry matter. The standarized milk was pasteurized in a high temperature heat exchanger (HTST) at 164° F. for 16 seconds and then cooled to 130° F. The cooled milk was then concentrated to 5× in a spiral wound ultrafiltration (UF) system with difiltration (DF) to reduce the lactose content to about 1 percent. The UF/DF milk (4222 pounds), with 2 percent added salt, was heat treated at 155° F. for 10 minutes in a agitated, jacketed vessel and then cooled to 78° F. The milk concentrate contained 41.8 percent solids, 22.6 percent fat, and 15.4 percent protein and had a pH of 6.4.

Lactic acid starter culture (0.01 percent; *Lactococcus lactis* and *Lactococcus lactis* ssp. *cremoris;* R603 from Chr. Hansens, Inc.), Micrococcus (0.001 percent), and pregastric esterase (0.02 percent) were added to the milk concentrate and fermented in a first stage for 17 hours at 75° F. to reach a pH of 5.16. L-methionine (0.1 percent), L-glutathione (0.1 percent), and an activated culture of *Brevibacterium linens* (1 percent) were added to the first stage fermentation product to initiate the second stage of the fermentation process. Prior to its use, the *Brevibacterium linens* culture was activated under aerobic conditions for 48 hours at 75° F. in tryptic soy broth (TSB). The second stage fermentation was continued for an additional 7 days with aeration at a temperature of 72° F.; the pH at the end of the second stage was 6.75. The level of sulfur compounds (i.e., methanethiol, dimethyidisulfide, and dimethyltrisulfide) increased dramatically during the fermentation process (see results in Table 3). The resulting sulfury-cheddar component was heated to 155° F. for ten minutes in order to inactivate the cultures and enzymes and to extend the shelf life of the product. A relatively small loss of sulfur compounds was observed in the deactivation step. The flavor profile for the resulting sulfury-cheddar component is in Table 3 above under the heading "Typical." The sulfury-cheddar component had a total solids of about 41 percent and could, if desired, be spray dried to form a sulfury-cheddar flavor powder.

Example 2

This example illustrates the preparation of the creamy-buttery component. A milk concentrate similar to the one prepared in Example 1 was used as the starting substrate.

Lactic acid starter culture (0.01 percent; *Lactococcus lactis* and *Lactococcus lactis* ssp. *cremoris;* R603 from Chr. Hansens, lnc.)and pregastric esterase (0.02 percent) were added to the milk concentrate and fermented in a first stage for 17 hours at 75° F. to reach a pH of 5.16. After heating to 82° F., sodium citrate (0.2 percent) and activated cultures of Leuconostoc (0.1 percent) and *Lactococcus lactis* ssp. *lactis* biovar. *diacetylactic* (0.1 percent) were added to the first stage fermentation product to initiate the second stage of the fermentation process. Prior to their use, the Leuconostoc and *Lactococcus lactis* ssp. *lactis* biovar. *diacetylactic* cultures were activated overnight at 75° F. in MRS broth. The second stage fermentation was continued for an additional 6 days with aeration at a temperature of 82° F.; the pH at the end of the second stage was 5.26. The diacetyl level increased from an initial value of about 1 ppm to about 176 ppm at the end of the second stage. The resulting creamy-buttery component was heated to 155° F. for ten minutes in order to inactivate the cultures and enzymes and to extend the shelf life of the product. A relatively small loss of diacetyl was observed in the deactivation step. The flavor profile for the resulting creamy-buttery component is in Table 5 above under the heading "Typical." The creamy-buttery component had a total solids of about 42 percent and could, if desired, be spray dried to form a creamy-buttery flavor powder.

Example 3

This example illustrates the preparation of the cheesy component. A milk concentrate was prepared using milk protein concentrate (MPC) powder, water, anhydrous milk fat, and salt.

MPC powder and salt were hydrated with warm water in a Vacuum-Cam Injection mixer to form a protein slurry. The protein slurry was transferred to an agitated jacketed vessel with continuous recirculation using a shear pump. Melted anhydrous milkfat was then added to form the milk concentrate. The resulting milk concentrate contained 43.5 percent solids, 8.6 percent fat, 13.7 percent protein, 2.8 percent lactose, and 1.85 percent salt.

The milk concentrate was maintained in the same agitated jacketed vessel with continuous recirculation using a shear pump during the fermentation process. Monosodium phosphate (0.5 percent) was added and the slurry was heated at 162° F for 15 minutes. After cooling to 104° F., an enzyme slurry containing neutral bacterial protease (about 0.18 percent; Enzeco Neutral Bacterial Protease 2X, Enzyme Development Corp.), *Lactobacillus helveticus* (about 0.14 percent; EnzoBact, Medipharm), fungal protease (about 0.28 percent; Promod 215, Biocatalysts), and fungal lipase (about 0.28 percent; Lipomod 187, Biocatalysts); percentages are based on the total weight of the fermentation mixture. Fermenation was continued for 48 hours at 104° F. with continuous agitation and recirculation using the shear pump to maintain an emulsion. After completion of the fermenation, the enzymes were inactivated by heating to 185° F. for 30 minutes; aeration was continued during inactivation but without using the shear pump. The flavor profile for the resulting cheesy component is in Table 7 above under the heading "Typical." Sorbic acid (about 0.1 percent) was then added. The cheesy component had a total solids of about 43 percent and could, if desired, be spray dried to form a cheesy flavor powder.

Example 4

Thirty-four pounds milk (3.5 percent butterfat) and 0.75 ml double strength annatto color were added to a small cheese vat at a temperature of 88° F. Frozen, pelleted starter culture (2.45 g; Chr. Hansens, Inc.) was added and the mixture allowed to ripen for 30 minutes. The flavor building block materials (i.e., sulfury-cheddary, creamy-buttery, and cheesy components produced in Examples 1, 2, and 3, respectively, at a 1:1:1 ratio; 30 g total) was mixed into the ripened milk. Rennet (1.7 ml Chymax Extra; Chr. Hansens, Inc.) was then added and the resulting mixture allowed to coagulate for 30 minutes without agitation. The set curd was then cut into ⅜ inch cubes and allowed to rest for 15 minutes. After this rest period, the curd was gently agitated by hand while increasing the temperature to 102° F. over a thirty minute period. The curd was cooked at 102° F. for one hour, at which time the whey was allowed to drain from the curd. The curd was allowed to fuse into a solid mass and flipped every 15 minutes over a 90 minute period. The resulting small slab was milled into ½×½×2 inch pieces. Three applications of salt (12.9 g/application) were made with 5 minute intervals between each application. The resulting salted curd was placed in small cheese hoops and pressed overnight. After pressing, the cheese was placed in a vacuum chamber and pressed for an additional hour. The fully pressed cheese was vacuum sealed in plastic until evaluation. Control cheese was prepared in the same manner except that the flavor building block materials were not included. The cheese prepared using the flavor build block materials provided good flavor and organoleptic characteristics.

Example 5

Thirty-four pounds milk (3.5 percent butterfat) and 0.75 ml double strength annatto color were added to a small cheese vat at a temperature of 88° F. Frozen, pelleted starter culture (2.45 g; Chr. Hansens, Inc.) was added and the mixture allowed to ripen for 30 minutes. Rennet (1.7 ml Chymax Extra; Chr. Hansens, Inc.) was then added and the resulting mixture allowed to coagulate for 30 minutes without agitation. The set curd was then cut into ⅜ inch cubes and allowed to rest for 15 minutes. After this rest period, the curd was gently agitated by hand while increasing the temperature to 102° F. over a thirty minute period. The curd was cooked at 102° F. for one hour, at which time the whey was allowed to drain from the curd. The curd was allowed to fuse into a solid mass and flipped every 15 minutes over a 90 minute period. The resulting small slab was milled into ½×½×2 inch pieces. Freeze-dried flavor building block materials (i.e., sulfury-cheddar, creamy-buttery, and cheesy components produced in Examples 1, 2, and 3, respectively, at a 1:1:1 ratio; 30 g total) was mixed with 38.9 g salt) and then divided into three portions. Three applications of the building block materials and salt mixture (22.9 g/application) were made with 5 minute intervals between each application. The resulting salted curd was placed in small cheese hoops and pressed overnight. After pressing, the cheese was placed in a vacuum chamber and pressed for an additional hour. The fully pressed cheese was vacuum sealed in plastic until evaluation. Control cheese was prepared in the same manner except that the flavor building block materials were not included. The cheese prepared using the flavor build block materials provided good flavor and organoleptic characteristics.

Example 6

Using the sulfury-cheddar flavor component prepared in Example 1, the creamy-buttery flavor component prepared in Example 2, and the cheesy flavor component prepared in Example 3, a pasteurized process cheese spread loaf having sharp cheddar flavor notes was prepared. About 1 percent of the sulfury-cheddar flavor component, about 4 percent of the creamy-buttery flavor component, and about 1 percent of the cheesy component were added to a mixture of young and mild cheeses. Other ingredients were then added at the following levels:

| Whey Powder | <1% |
|---|---|
| Milk Protein Concentrate | <1% |
| Sorbic Acid | <0.5% |
| Cheese Color | <0.5% |
| Monosodium Phosphate & Disodium Phosphate | ~3% |

The resulting cheese mixture was processed in a Damrow laydown direct steam injected cooker (Damrow Co., Inc., Fond du Lac, Wis.) at 175° F. The hot melted cheese was formed into 2 pound loaves and cooled in a forced air cooler to 40° F. The resulting pasteurized process cheese spread loaf had flavor, texture, and meltability similar to prepared cheese products made with aged cheddar cheese.

What is claimed is:

1. A flavoring system for food products, said system comprising a sulfury-cheddar flavor component, a creamy-buttery flavor component, and a cheesy flavor component,
wherein the sulfury-cheddar flavor component is prepared by treating a first milk concentrate with a lactic acid culture at a temperature of about 70 to about 86° F. for about 10 to about 24 hours to obtain first mixture having a pH of about 5.4 or less, adding a sulfur-containing substrate to the first mixture to form a second mixture, treating the second mixture with a *Brevibacterium linens* culture or a yeast from the genera Debaromyces or Kluyeromyces, whereby the *Brevibacterium linens* culture or the yeast can convert the sulfur-containing substrate to sulfur-containing flavor compounds, at a temperature of about 65 to about 86° F. for about 3 to about 10 days to form a third mixture, and treating the third mixture at a temperature sufficient to inactivate the cultures and enzymes in the third mixture to form the sulfury-cheddar flavor component;
wherein the creamy-buttery flavor component is prepared by treating a second milk concentrate with a lactic acid culture at a temperature of about 70 to about 86° F. for about 10 to about 24 hours to form a fourth mixture, adding sodium citrate to the fourth mixture to form a fifth mixture, treating the fifth mixture with a diacetyl-producing flavor culture at about 70 to about 90° F. for about 1 to about 10 days to form a sixth mixture, and treating the sixth mixture at a temperature sufficient to inactivate the cultures and enzymes in the sixth mixture to form the creamy-buttery flavor component;
wherein the cheesy flavor component is prepared by treating a third milk concentrate with a lipase, a protease, and a peptidase at a temperature of about 60 to about 140° F. for about 0.5 to about 10 days to form a seventh mixture and treating the seventh mixture at a temperature sufficient to inactivate enzymes in the seventh mixture to form the cheesy flavor component; and
wherein the sulfury-cheddar flavor component, the creamy-buttery flavor component, and the cheesy flavor component of the cheese flavoring system can be incorporated in varying amounts into food products to produce a wide variety of flavors.

2. The flavoring system of claim 1, wherein the food products are cheese products and the sulfury-cheddar flavor component, the creamy-buttery flavor component, and the cheesy flavor component of the flavoring system are incorporated into a cheese or dairy base to produce the cheese products.

3. The flavoring system of claim 2, wherein the first milk concentrate is also treated with a lipolytic enzyme and a high proteolytic activity culture, wherein the second milk concentrate is also treated with a lipolytic enzyme, and wherein the *Brevibacterium linens* culture is used to prepare the sulfury-cheddar flavor component.

4. The favoring system of claim 3, wherein the sulfur-containing substrate is L-methionine, L-glutathione, L-cysteine, or mixtures thereof.

5. The flavoring system of claim 4, wherein the first milk concentrate, the second milk concentrate, and the third milk concentrate are prepared by an ultrafiltration/diafiltration process, and wherein the first milk concentrate, the second milk concentrate, and the third milk concentrate independently have total solid levels of about 30 to about 50 percent, moisture levels of about 50 to about 70 percent, fat levels of about 15 to about 27 percent, protein levels of about 10 to about 20 percent, lactose levels of about 0.5 to about 2 percent, and salt levels of about 1 to about 3 percent.

6. The flavoring system of claim 4, wherein the lactic acid culture used to prepare the sulfury-cheddar flavor component is *Lactococcus lactis* and *Lactococcus lactis* ssp. *cremoris;* the lipolytic enzyme used to prepare the sulfury-cheddar flavor component is pregastric esterase; and the high proteolytic activity culture used to prepare the sulfury-cheddar flavor component is a Micrococcus.

7. The flavoring system of claim 5, wherein the lactic acid culture used to prepare the sulfury-cheddar flavor component is *Lactococcus lactis, Lactococcus lactis* ssp. *cremoris,* or mixtures thereof; the lipolytic enzyme used to prepare the sulfury-cheddar flavor component is pregastric esterase; and the high proteolytic activity culture used to prepare the sulfury-cheddar flavor component is a Micrococcus.

8. The flavoring system of claim 4, wherein the lactic acid culture used to prepare the creamy-buttery flavor component is *Lactococcus lactis, Lactococcus lactis* ssp. *cremoris,* or mixtures thereof; the lipolytic enzyme used to prepare the creamy-buttery flavor component is pregastric esterase; and the diacetyl-producing flavor culture used to prepare the creamy-buttery flavor component is Leuconostoc, *Lactococcus lactis* ssp. *lactis* biovar. *diaetylactis,* or mixtures thereof.

9. The flavoring system of claim 5, wherein the lactic acid culture used to prepare the creamy-buttery flavor component is *Lactococcus lactis, Lactococcus lactis* ssp. *cremoris,* or mixtures thereof; the lipolytic enzyme used to prepare the creamy-buttery flavor component is pregastric esterase; and the diacetyl-producing flavor culture used to prepare the creamy-buttery flavor component is Leuconostoc, *Lactococcus lactis* ssp. *lactis* biovar. *diaetylactis,* or mixtures thereof.

10. The flavoring system of claim 4, wherein the lipase used to prepare the cheesy flavor component is a fungal lipase; the protease used to prepare the cheesy flavor component is a neutral bacterial protease, a fungal protease, or mixtures thereof; and the peptidase used to prepare the cheesy flavor component is from *Lactobacillus helveticus.*

11. The flavoring system of claim 5, wherein the lipase used to prepare the cheesy flavor component is a fungal lipase; the protease used to prepare the cheesy flavor component is a neutral bacterial protease, a fungal protease, or mixtures thereof; and the peptidase used to prepare the cheesy flavor component is from *Lactobacillus helveticus.*

12. The flavoring system of claim 4, wherein the lactic acid culture used to prepare the sulfury-cheddar flavor component is *Lactococcus lactis* and *Lactococcus lactis* ssp. *cremoris,* the lipolytic enzyme used to prepare the sulfury-cheddar flavor component is pregastric esterase, and the high proteolytic activity culture used to prepare the sulfury-cheddar flavor component is a Micrococcus;

wherein the lactic acid culture used to prepare the creamy-buttery flavor component is *Lactococcus lactis, Lactococcus lactis* ssp. *cremoris,* or mixtures thereof, the lipolytic enzyme used to prepare the creamy-buttery flavor component is pregastric esterase, and the diacetyl-producing flavor culture used to prepare the creamy-buttery flavor component is Leuconostoc, *Lactoccocus lactis* ssp. *lactis* biovar. *diaetylactis,* or mixtures thereof; and wherein the lipase used to prepare the cheesy flavor component is a fungal lipase, the protease used to prepare the cheesy flavor component is a neutral bacterial protease, a fungal protease, or mixtures thereof, and the peptidase used to prepare the cheesy flavor component is from *Lactobacillus helveticus.*

13. The flavoring system of claim 5, wherein the lactic acid culture used to prepare the sulfury-cheddar flavor component is *Lactococcus lactis* and *Lactococcus lactis* ssp. *cremoris,* the lipolytic enzyme used to prepare the sulfury-cheddar flavor component is pregastric esterase, and the high proteolytic activity culture used to prepare the sulfury-cheddar flavor component is a Micrococcus;

wherein the lactic acid culture used to prepare the creamy-buttery flavor component is *Lactococcus lactis, Lactococcus lactis* ssp. *cremoris,* or mixtures thereof, the lipolytic enzyme used to prepare the creamy-buttery flavor component is pregastric esterase, and the diacetyl-producing flavor culture used to prepare the creamy-buttery flavor component is Leuconostoc, *Lactoccocus lactis* ssp. *lactis* biovar. *diaetylactis,* or mixtures thereof; and wherein the lipase used to prepare the cheesy flavor component is a fungal lipase, the protease used to prepare the cheesy flavor component is a neutral bacterial protease, a fungal protease, or mixtures thereof, and the peptidase used to prepare the cheesy flavor component is from *Lactobacillus helveticus.*

14. The flavoring system of claim 4, wherein the sulfury-cheddar flavor component is dried to form a powdered sulfury-cheddar flavor component, the creamy-buttery flavor component is dried to form the powdered creamy-buttery flavor component, and the cheesy flavor component is dried to form a powdered cheesy flavor component.

15. The flavoring system of claim 5, wherein the sulfury-cheddar flavor component is dried to form a powdered sulfury-cheddar flavor component, the creamy-buttery flavor component is dried to form the powdered creamy-buttery flavor component, and the cheesy flavor component is dried to form a powdered cheesy flavor component.

16. The flavoring system of claim 12, wherein the sulfury-cheddar flavor component is dried to form a powdered sulfury-cheddar flavor component, the creamy-buttery flavor component is dried to form the powdered creamy-buttery flavor component, and the cheesy flavor component is dried to form a powdered cheesy flavor component.

17. The flavoring system of claim 13, wherein the sulfury-cheddar flavor component is dried to form a powdered sulfury-cheddar flavor component, the creamy-buttery flavor component is dried to form the powdered creamy-buttery flavor component, and the cheesy flavor component is dried to form a powdered cheesy flavor component.

18. A method of preparing a flavored cheese using a cultured cheese concentrate, said method comprising:

(1) preparing a cheese or dairy base;

(2) incorporating about 1 to about 10 percent of the cultured cheese concentrate into the cheese or dairy base to form the flavored cheese;

wherein the cultured cheese concentrate comprises 0 to about 80 percent of a sulfury-cheddar flavor component, about 10 to about 90 percent of a creamy-buttery flavor component, and about 10 to about 90 percent of a cheesy flavor component;

wherein the sulfury-cheddar flavor component is prepared by treating a first milk concentrate with a lactic acid culture at a temperature of about 70 to about 86° F. for about 10 to about 24 hours to obtain first mixture having a pH of about 5.4 or less, adding a sulfur-containing substrate to the first mixture to form a second mixture, treating the second mixture with a *Brevibacterium linens* culture or a yeast from the genera Debaromyces or Kluyeromyces, whereby the *Brevibacterium linens* culture or the yeast can convert the sulfur-containing substrate to sulfur-containing flavor compounds, at a temperature of about 65 to about 86° F. for about 3 to about 10 days to form a third mixture, and treating the third mixture at a temperature sufficient to inactivate cultures and enzymes in the third mixture to form the sulfury-cheddar flavor component;

wherein the creamy-buttery flavor component is prepared by treating a second milk concentrate with a lactic acid culture at a temperature of about 70 to about 86° F. for about 10 to about 24 hours to form a fourth mixture, adding sodium citrate to the fourth mixture to form a fifth mixture, treating the fifth mixture with a diacetyl-producing flavor culture at about 70 to about 90° F. for about 1 to about 10 days to form a sixth mixture, and treating the sixth mixture at a temperature sufficient to inactivate the cultures and enzymes in the sixth mixture to form the creamy-buttery flavor component;

wherein the cheesy flavor component is prepared by treating a third milk concentrate with a lipase, a protease, and a peptidase at a temperature of about 60 to about 140° F for about 0.5 to about 10 days to form a fifth mixture and treating the fifth mixture at a temperature sufficient to inactivate enzymes in the fifth mixture to form the cheesy flavor component; and wherein the amounts of the sulfury-cheddar flavor component, the creamy-buttery flavor component, and the cheesy flavor component in the cultured cheese concentrate and the amount of cultured cheese concentrate incorporated into the cheese or dairy base can be adjusted to obtain flavored cheeses having a wide variety of flavors.

19. The method as in claim 18, wherein the first milk concentrate is also treated with a lipolytic enzyme and a high proteolytic activity culture, wherein the second milk concentrate is also treated with a lipolytic enzyme, and wherein the *Brevibacterium linens* culture is used to prepare the sulfury-cheddar flavor component.

20. The method as in claim 19, wherein the sulfur-containing substrate is L-methionine, L-glutathione, L-cysteine, or mixtures thereof.

21. The method as in claim 19, wherein the cultured cheese concentrate comprises about 25 to about 75 percent of the sulfury-cheddar flavor component, about 25 to about 75 percent of the creamy-buttery flavor component, and about 25 to about 75 percent of the cheesy flavor component.

22. The method as in claim 19, wherein the lactic acid culture used to prepare the sulfury-cheddar flavor component is *Lactococcus lactis* and *Lactococcus lactis* ssp. *cremoris,* the lipolytic enzyme used to prepare the sulfury-cheddar flavor component is pregastric esterase, and the high proteolytic activity culture used to prepare the sulfury-cheddar flavor component is a Micrococcus; wherein the lactic acid culture used to prepare the creamy-buttery flavor component is *Lactococcus lactis, Lactococcus lactis* ssp. *cremoris,* or mixtures thereof, the lipolytic enzyme used to prepare the creamy-buttery flavor component is pregastric esterase, and the diacetyl-producing flavor culture used to prepare the creamy-buttery flavor component is Leuconostoc, *Lactoccocus lactis* ssp. *lactis* biovar. *diaetylactis,* or mixtures thereof; and wherein the lipase used to prepare the cheesy flavor component is a fungal lipase, the protease used to prepare the cheesy flavor component is a neutral bacterial protease, a fungal protease, or mixtures thereof, and the peptidase used to prepare the cheesy flavor component is from *Lactobacillus helveticus.*

23. The method of claim 19, wherein the cultured cheese concentrate is a dried powder.

24. The method of claim 22, wherein the cultured cheese concentrate is a dried powder.

25. A method of preparing a flavored cheese using a cultured cheese concentrate, said method comprising:

(1) preparing a milk substrate suitable for producing a cheese;

(2) incorporating about 1 to about 10 percent of the cultured cheese concentrate into the milk substrate;

(3) treating the milk substrate and cultured cheese concentrate to set the milk substrate;

(4) cutting the set milk substrate to form curds and whey;

(5) cooking the curds and whey;

(6) separating the curds from the whey; and (7) forming the flavored cheese from the separated curds;

wherein the cultured cheese concentrate comprises 0 to about 80 percent of a sulfury-cheddar flavor component, about 10 to about 90 percent of a creamy-buttery flavor component, and about 10 to about 90 percent of a cheesy flavor component;

wherein the sulfury-cheddar flavor component is prepared by treating a first milk concentrate with a lactic acid culture at a temperature of about 70 to about 86° F. for about 10 to about 24 hours to obtain first mixture having a pH of about 5.4 or less, adding a sulfur-containing substrate to the first mixture to form a second mixture, treating the second mixture with a *Brevibacterium linens* culture or a yeast from the genera Debaromyces or Kluyeromyces, whereby the *Brevibacterium linens* culture or the yeast can convert the sulfur-containing substrate to sulfur-containing flavor compounds, at a temperature of about 65 to about 86° F. for about 3 to about 10 days to form a third mixture, and treating the third mixture at a temperature sufficient to inactivate cultures and enzymes in the third mixture to form the sulfury-cheddar flavor component;

wherein the creamy-buttery flavor component is prepared by treating a second milk concentrate with a lactic acid culture at a temperature of about 70 to about 86° F. for about 10 to about 24 hours to form a fourth mixture, adding sodium citrate to the fourth mixture to form a fifth mixture, treating the fifth mixture with a diacetyl-producing flavor culture at about 70 to about 90° F. for about 1 to about 10 days to form a sixth mixture, and treating the sixth mixture at a temperature sufficient to inactivate the cultures and enzymes in the sixth mixture to form the creamy-buttery flavor component;

wherein the cheesy flavor component is prepared by treating a third milk concentrate with a lipase, a protease, and a peptidase at a temperature of about 60 to about 140° F. for about 0.5 to about 10 days to form a fifth mixture and treating the fifth mixture at a temperature sufficient to inactivate enzymes in the fifth mixture to form the cheesy flavor component; and wherein the amounts of the sulfury-cheddar flavor component, the creamy-buttery flavor component, and the cheesy flavor component in the cultured cheese concentrate and the amount of cultured cheese concentrate incorporated into the milk substrate can be adjusted to obtain flavored cheeses having a wide variety of flavors.

26. The method as in claim 25, wherein the first milk concentrate is also treated with a lipolytic enzyme and a high proteolytic activity culture, wherein the second milk concentrate is also treated with a lipolytic enzyme wherein the *Brevibacterium linens* culture is used to prepare the sulfury-cheddar flavor component.

27. The method as in claim 26, wherein the sulfur-containing substrate is L-methionine, L-glutathione, L-cysteine, or mixtures thereof.

28. The method as in claim 27, wherein the lactic acid culture used to prepare the sulfury-cheddar flavor component is *Lactococcus lactis* and *Lactococcus lactis* ssp. *cremoris,* the lipolytic enzyme used to prepare the sulfury-cheddar flavor component is pregastric esterase, and the high proteolytic activity culture used to prepare the sulfury-cheddar flavor component is a Micrococcus; wherein the lactic acid culture used to prepare the creamy-buttery flavor component is *Lactococcus lactis, Lactococcus lactis* ssp. *cremoris,* or mixtures thereof, the lipolytic enzyme used to prepare the creamy-buttery flavor component is pregastric esterase, and the diacetyl-producing flavor culture used to prepare the creamy-buttery flavor component is Leuconostoc, *Lactoccocus lactis* ssp. *lactis* biovar. *diaetylactis,* or mixtures thereof; and wherein the lipase used to prepare the cheesy flavor component is a fungal lipase, the protease used to prepare the cheesy flavor component is a neutral bacterial protease, a fungal protease, or mixtures thereof, and the peptidase used to prepare the cheesy flavor component is from *Lactobacillus helveticus.*

29. The method as in claim 28, wherein the cultured cheese concentrate comprises about 25 to about 75 percent of the sulfury-cheddar flavor component, about 25 to about 75 percent of the creamy-buttery flavor component, and about 25 to about 75 percent of the cheesy flavor component.

30. The method of claim 27, wherein the cultured cheese concentrate is a dried powder.

31. The method of claim 29, wherein the cultured cheese concentrate is a dried powder.

32. A sulfury-cheddar flavor component for use in cheese flavoring, wherein the sulfury-cheddar flavor component is prepared by treating a milk concentrate with a lactic acid culture at a temperature of about 70 to about 86° F. for about 10 to about 24 hours to obtain first mixture having a pH of about 5.4 or less, adding a sulfur-containing substrate to the first mixture to form a second mixture, treating the second mixture with a *Brevibacterium linens* culture or a yeast from the genera Debaromyces or Kluyeromyces, whereby the

*Brevibacterium linens* culture or the yeast can convert the sulfur-containing substrate to sulfur-containing flavor compounds, at a temperature of about 65 to about 86° F. for about 3 to about 10 days to form a third mixture, and treating the third mixture at a temperature sufficient to inactivate enzymes in the third mixture to form the sulfury-cheddar flavor component.

33. The sulfury-cheddar flavor component of claim 32, wherein the milk concentrate is also treated with a lipolytic enzyme and a high proteolytic activity culture, and wherein the *Brevibacterium linens* culture is used to prepare the sulfury-cheddar flavor component.

34. The sulfury-cheddar flavor component of claim 33, wherein the sulfur-containing substrate is L-methionine, L-glutathione, L-cysteine, or mixtures thereof.

35. The sulfury-cheddar flavor component of claim 34, wherein the lactic acid culture is *Lactococcus lactis* and *Lactococcus lactis* ssp. *cremoris*, the lipolytic enzyme is pregastric esterase, and the high proteolytic activity culture is a Micrococcus.

36. The sulfury-cheddar flavor component of claim 33, wherein the sulfury-cheddar flavor component is a dried powder.

37. The sulfury-cheddar flavor component of claim 34, wherein the sulfury-cheddar flavor component is a dried powder.

38. A flavoring system for food products, said system comprising a sulfury-cheddar flavor component, a creamy-buttery flavor component, and a cheesy flavor component, wherein the sulfury-cheddar flavor component is prepared by treating a first milk concentrate with a lactic acid culture, a sulfur-containing substrate, and a *Brevibacterium linens* culture or a yeast from the genera Debaromyces or Kluyeromyces, whereby the *Brevibacterium linens* culture or the yeast can convert the sulfur-containing substrate to sulfur-containing flavor compounds, at a temperature of about 65 to about 86° F. for about 3 to about 10 days to form a first mixture, and treating the first mixture at a temperature sufficient to inactivate cultures and enzymes in the first mixture to form the sulfury-cheddar flavor component;

wherein the creamy-buttery flavor component is prepared by treating a second milk concentrate with a lactic acid culture, a diacetyl-producing flavor culture, and sodium citrate at a temperature of about 70 to about 90° F. for about 1 to about 10 days to form a second mixture and treating the second mixture at a temperature sufficient to inactivate cultures and enzymes in the second mixture to form the creamy-buttery flavor component;

wherein the cheesy flavor component is prepared by treating a third milk concentrate with a lipase, a protease, and a peptidase at a temperature of about 60 to about 140° F. for about 0.5 to about 10 days to form a third mixture and treating the third mixture at a temperature sufficient to inactivate enzymes in the third mixture to form the cheesy flavor component; and wherein the sulfury-cheddar flavor component, the creamy-buttery flavor component, and the cheesy flavor component of the cheese flavoring system can be incorporated in varying amounts into food products to produce a wide variety of flavors.

39. The flavoring system of claim 38, wherein the food products are cheese products and the sulfury-cheddar flavor component, the creamy-buttery flavor component, and the cheesy flavor component of the flavoring system are incorporated into a cheese or dairy base to produce the cheese products.

40. The flavoring system of claim 39, wherein the first milk concentrate is also treated with a lipolytic enzyme and a high proteolytic activity culture, wherein the second milk concentrate is also treated with a lipolytic enzyme wherein the *Brevibacterium linens* culture is used to prepare the sulfury-cheddar flavor component.

41. The flavoring system of claim 40, wherein the sulfur-containing substrate is L-methionine, L-glutathione, L-cysteine, or mixtures thereof.

42. The flavoring system of claim 39, wherein the lactic acid culture used to prepare the sulfury-cheddar flavor component is *Lactococcus lactis* and *Lactococcus lactis* ssp. *cremoris;* wherein the lactic acid culture used to prepare the creamy-buttery flavor component is *Lactococcus lactis, Lactococcus lactis* ssp. *cremoris*, or mixtures thereof and the diacetyl-producing flavor culture used to prepare the creamy-buttery flavor component is Leuconostoc, *Lactoccocus lactis* ssp. *lactis* biovar. *diaetylactis*, or mixtures thereof; and wherein the lipase used to prepare the cheesy flavor component is a fungal lipase, the protease used to prepare the cheesy flavor component is a neutral bacterial protease, a fungal protease, or mixtures thereof, and the peptidase used to prepare the cheesy flavor component is from *Lactobacillus helveticus*.

43. The flavoring system of claim 40, wherein the lactic acid culture used to prepare the sulfury-cheddar flavor component is *Lactococcus lactis* and *Lactococcus lactis* ssp. *cremoris*, the lipolytic enzyme used to prepare the sulfury-cheddar flavor component is pregastric esterase, and the high proteolytic activity culture used to prepare the sulfury-cheddar flavor component is a Micrococcus; wherein the lactic acid culture used to prepare the creamy-buttery flavor component is *Lactococcus lactis, Lactococcus lactis* ssp. *cremoris*, or mixtures thereof, the lipolytic enzyme used to prepare the creamy-buttery flavor component is pregastric esterase, and the diacetyl-producing flavor culture used to prepare the creamy-buttery flavor component is Leuconostoc, *Lactoccocus lactis* ssp. *lactis* biovar. *diaetylactis*, or mixtures thereof; and wherein the lipase used to prepare the cheesy flavor component is a fungal lipase, the protease used to prepare the cheesy flavor component is a neutral bacterial protease, a fungal protease, or mixtures thereof, and the peptidase used to prepare the cheesy flavor component is from *Lactobacillus helveticus*.

44. The flavoring system of claim 41, wherein the lactic acid culture used to prepare the sulfury-cheddar flavor component is *Lactococcus lactis* and *Lactococcus lactis* ssp. *cremoris*, the lipolytic enzyme used to prepare the sulfury-cheddar flavor component is pregastric esterase, and the high proteolytic activity culture used to prepare the sulfury-cheddar flavor component is a Micrococcus; wherein the lactic acid culture used to prepare the creamy-buttery flavor component is *Lactococcus lactis, Lactococcus lactis* ssp. *cremoris*, or mixtures thereof, the lipolytic enzyme used to prepare the creamy-buttery flavor component is pregastric esterase, and the diacetyl-producing flavor culture used to prepare the creamy-buttery flavor component is Leuconostoc, *Lactoccocus lactis* ssp. *lactis* biovar. *diaetylactis*, or mixtures thereof; and wherein the lipase used to prepare the cheesy flavor component is a fungal lipase, the protease used to prepare the cheesy flavor component is a neutral bacterial protease, a fungal protease, or mixtures thereof, and the peptidase used to prepare the cheesy flavor component is from *Lactobacillus helveticus*.

* * * * *